(12) United States Patent
Marsh

(10) Patent No.: US 8,856,175 B2
(45) Date of Patent: Oct. 7, 2014

(54) METHOD AND COMPUTER-READABLE MEDIA FOR MANAGING BUSINESS TRANSACTIONS

(76) Inventor: Robert E. Marsh, Kansas City, MO (US)

( * ) Notice: Subject to any disclaimer, the term of this patent is extended or adjusted under 35 U.S.C. 154(b) by 515 days.

(21) Appl. No.: 12/981,251

(22) Filed: Dec. 29, 2010

(65) Prior Publication Data

US 2012/0173579 A1   Jul. 5, 2012

(51) Int. Cl.
*G06F 17/30* (2006.01)
*G06F 21/60* (2013.01)

(52) U.S. Cl.
CPC .................................. *G06F 21/604* (2013.01)
USPC ........... 707/783; 707/706; 707/713; 707/723; 707/736; 707/758; 707/781; 707/782; 707/784; 707/785; 707/786; 707/787; 707/788; 709/225

(58) Field of Classification Search
USPC ......... 707/706, 713, 723, 736, 758, 781–788; 709/225
See application file for complete search history.

(56) References Cited

U.S. PATENT DOCUMENTS

| 2011/0264681 A1* | 10/2011 | Kimberlin et al. ............ 707/767 |
| 2012/0096158 A1* | 4/2012 | Astete et al. .................. 709/225 |
| 2012/0110328 A1* | 5/2012 | Pate et al. ..................... 713/165 |

* cited by examiner

*Primary Examiner* — Syling Yen
(74) *Attorney, Agent, or Firm* — Hovey Williams LLP

(57) ABSTRACT

A method, and computer-readable media for performing the method, for managing business transactions. Electronic transaction documents are received from authenticated users and stored in a database, with system usage data regarding users' access to and use of the system captured and stored in the database. Only specified parties are afforded access to system usage data for each user.

3 Claims, 3 Drawing Sheets

METHOD AND COMPUTER-READABLE MEDIA FOR MANAGING BUSINESS TRANSACTIONS

BACKGROUND OF THE INVENTION

On-line document collaboration systems are used to facilitate the exchange of business transaction documents via a secure Internet website. These systems are particularly useful in situations in which multiple versions of a document are exchanged among multiple users who store and retrieve documents to and from a database. Versions of different documents may be presented in an organized manner allowing retrieval of both current and prior versions of each of the documents involved. Examples of on-line document collaboration systems are described in US Pub No. 2002/0107768 and US Pub No. 2008/0313186. On-line document collaboration systems are also useful for the posting of various documents in a database for review or consideration by other parties having access to the system, serving as electronic due diligence "data rooms" in business acquisition transactions.

In many cases documents are exchanged or presented for review in an environment involving multiple parties on different sides of a transaction. For example, document drafts may be exchanged between a buyer and seller of a business (and their attorneys and advisers). Due diligence documents relating to a seller's business may be reviewed by the prospective buyer prior to and during the negotiation of purchase transaction documents. The interests of these parties differ and would in many cases be considered "adverse." While full document access for all parties is desirable, some transaction information should not be shared with all parties.

A useful attribute of on-line document collaboration systems is the ability to monitor who has accessed the system and how frequently that access has occurred, what specific documents on the system have been reviewed and the time spent reviewing them, what documents have been downloaded or printed, and other similar data ("system usage data"). In prior art systems, however, access to system usage data is only available to the party who has contracted for the document collaboration service. In the case of on-line data room services, this system usage data is typically available only to the seller who has set up the data room.

System usage data has many confidential or otherwise sensitive components. For example, which of a party's executives have accessed the system and which documents they reviewed (or for how long) would often be considered confidential, and potentially could be used in subsequent litigation to show the role or knowledge of particular employees. On the other hand, the ability to review access history provides a valuable tool to manage the due diligence or contract negotiation process. The present invention addresses the tension between providing open and visible document database to all parties and the desirability of collecting and making available more confidential system usage data.

SUMMARY OF THE INVENTION

The present invention addresses these transaction management issues in an on-line document collaboration system by providing a new method of managing access to system usage data. In this invention, a specified monitor has the ability to access system usage data based on the identity of a user. This monitor may be the administrator who authorized the user or may be a party approved by the user.

BRIEF DESCRIPTION OF THE DRAWINGS

This invention is described in detail below with reference to the attached drawing figures.

DETAILED DESCRIPTION OF THE INVENTION

This invention is comprised of the method described in more detail below. The invention also comprises one or more computer-readable media having computer-executable instructions embodied thereon and associated processors and memory for performing this method. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
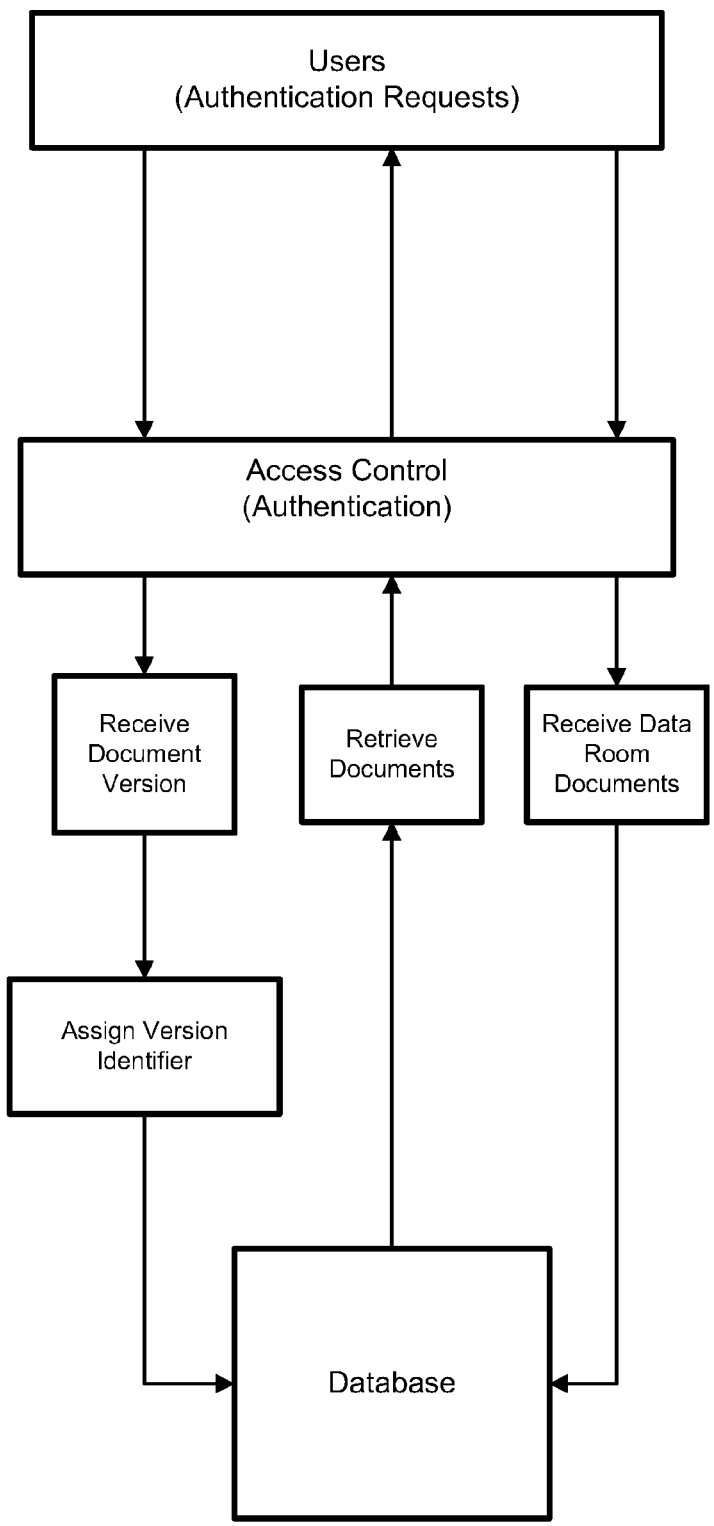
FIG. 1 is a block diagram showing the general configuration of an on-line document collaboration exchange system.

FIG. 1 shows the general configuration of an on-line document collaboration system. Users (after they have been authenticated) may submit and retrieve documents to a shared database. To facilitate the negotiation process, some document versions exchanged might be in a format that can be easily modified, such as a Microsoft Word format. Other documents (such as those in an electronic "data room") may be posted for review but not modification and may be in a nonalterable format (such as Adobe PDF).

Figure 2:
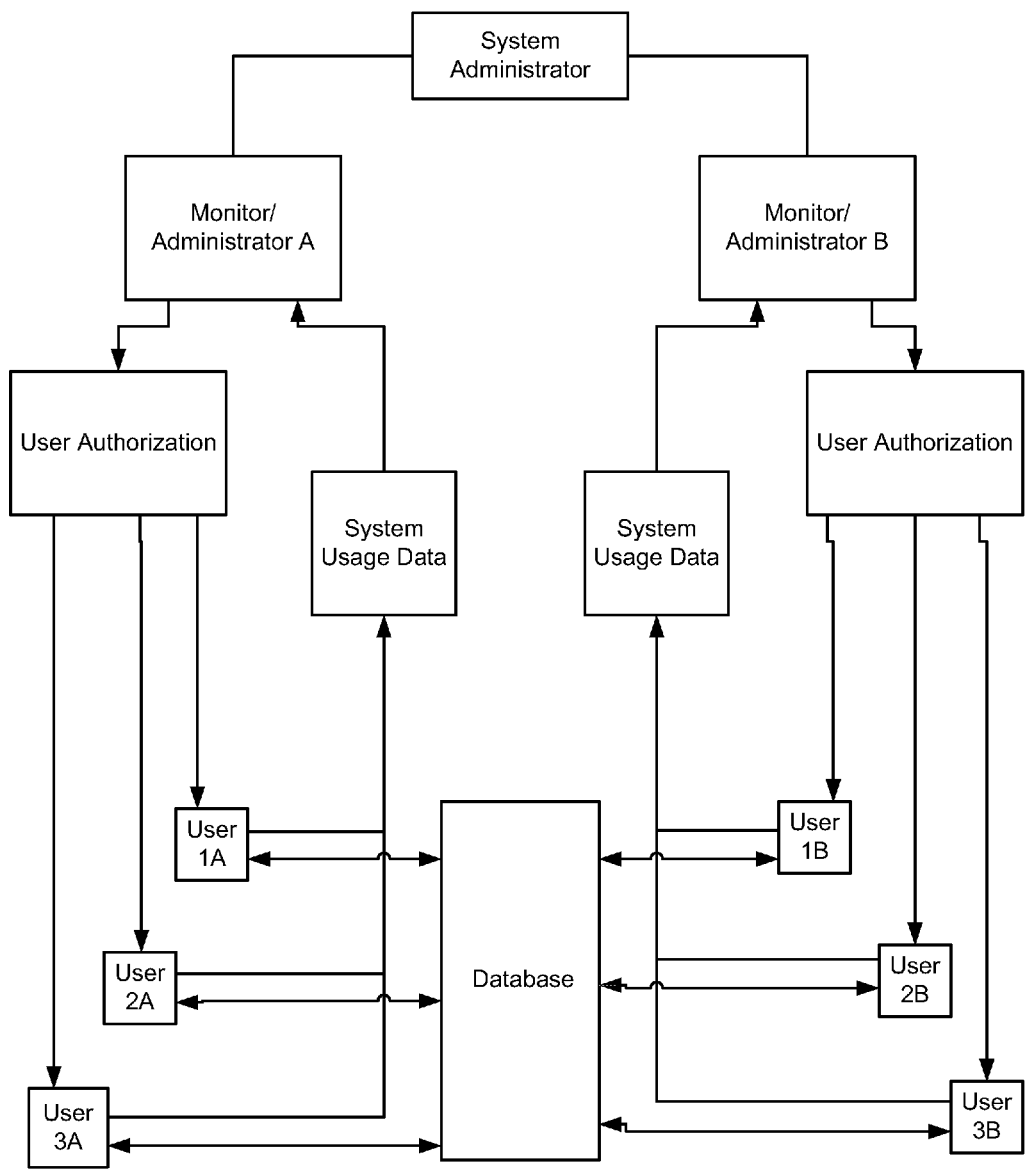
FIG. 2 is a block diagram showing key method steps and elements of a preferred embodiment of the present invention.

As shown in FIG. 2, in a preferred embodiment of the present invention, at least two different parties are "monitors" with the ability to access system usage data for specified users, and in this embodiment these monitors are also the parties with the ability to authorize new users. Users with the ability to authorize additional users are called "administrators" in this application. Administrators also have the ability to de-authorize users (but only users that they originally authorized). Hence each administrator is able to authorize and manage their own set of users. An administrator would not have the ability to deny access to users authorized by a different administrator. But all users, once authenticated, would preferably have access to all documents available in the database. Alternatively, document access limitations could be applied—by administrators or by system design parameters—to limit access to specific users or categories of users. In the preferred embodiment shown in FIG. 2 the monitors are also administrators—and can both authorize users and access system usage data for those users in authorizes. In other embodiments, however, the monitor need not be an administrator.

Data regarding a user's usage of the database is captured and stored in a database (which may be the same database in which the electronic documents are stored) in a manner customary in the art. This system usage data may include such data as times the database was accessed by the user, which documents were retrieved by the user, the time spent with a document open, and other details on database usage. The present invention limits access to this information only to an identified monitor who, in this preferred embodiment, is the administrator who established the user—not other administrators involved in the transaction. As shown in FIG. 2, when a user is authorized by an administrator (for example, Monitor/Administrator A), a unique identifier is defined for that user that includes a code to identify the administrator that generated the authorization. In FIG. 2, User 1A, User 2A and User 3A are all users authorized by Monitor/Administrator A. As these users access the database, system usage data is collected regarding that user. Monitor/Administrator A is able to retrieve system usage data relating to User 1A, User 2A and User 3A. But Monitor/Administrator B would not have access to any system usage data relating to User 1A, User 2A and User 3A.

Alternatively, the monitor could be any user afforded access to the system for purposes of monitoring activity by designated users. In this case, a unique identifier is defined for that user that includes a code to identify the monitor with access to system usage data. Where the monitor is not also the administrator who authorized the user, it is desirable to give either the user or the administrator who authorized that user (or both) the ability to "approve" the monitor for access to that user's system usage data.

It is also desirable to afford the ability to disable any collection of system usage data or to establish a time limit on the retention of system usage data. These limits could be applied as system-defined parameters or specified by a monitor or administrator. For example, all system usage data could be deleted after a defined time period (such as 5 days) or upon completion of the transaction or upon finalization of the document. A system for finalization of transaction documents in a comparable system in described in US Pub No. 2008/0313186.

Referring to FIG. 1, in a preferred embodiment of the invention application software (created, for example, using ColdFusion 8) is installed on a computer with an operating system software (such as, for example, Windows 2003 server). The process begins with a user providing an authentication request. The application software authenticates users seeking access to the system (for example, via the Internet) by comparing a user provided user name and password against a list of authorized list of user names and passwords. Preferably a "firewall" is also present between authenticated users and the application server to allow passage of only certain types of data packet transmissions (such as, for example, http or https).

The application software receives electronic documents submitted by authenticated users. Documents submitted as versions for subsequent modification are assigned version identifiers. The application software communicates with a database server and associated software (such as, for example, Microsoft SQL Server) for storage of these electronic documents and related version identifiers. The application software and database server software may be installed on one computer or on different computers. For purposes of this application, "database" includes the computer-readable media and associated processors necessary to index and store electronic document files on one or more computers.

Electronic documents received by the application software are stored in the database, together with any corresponding document version identifiers. Authenticated users may retrieve electronic documents from the database.

Figure 3:
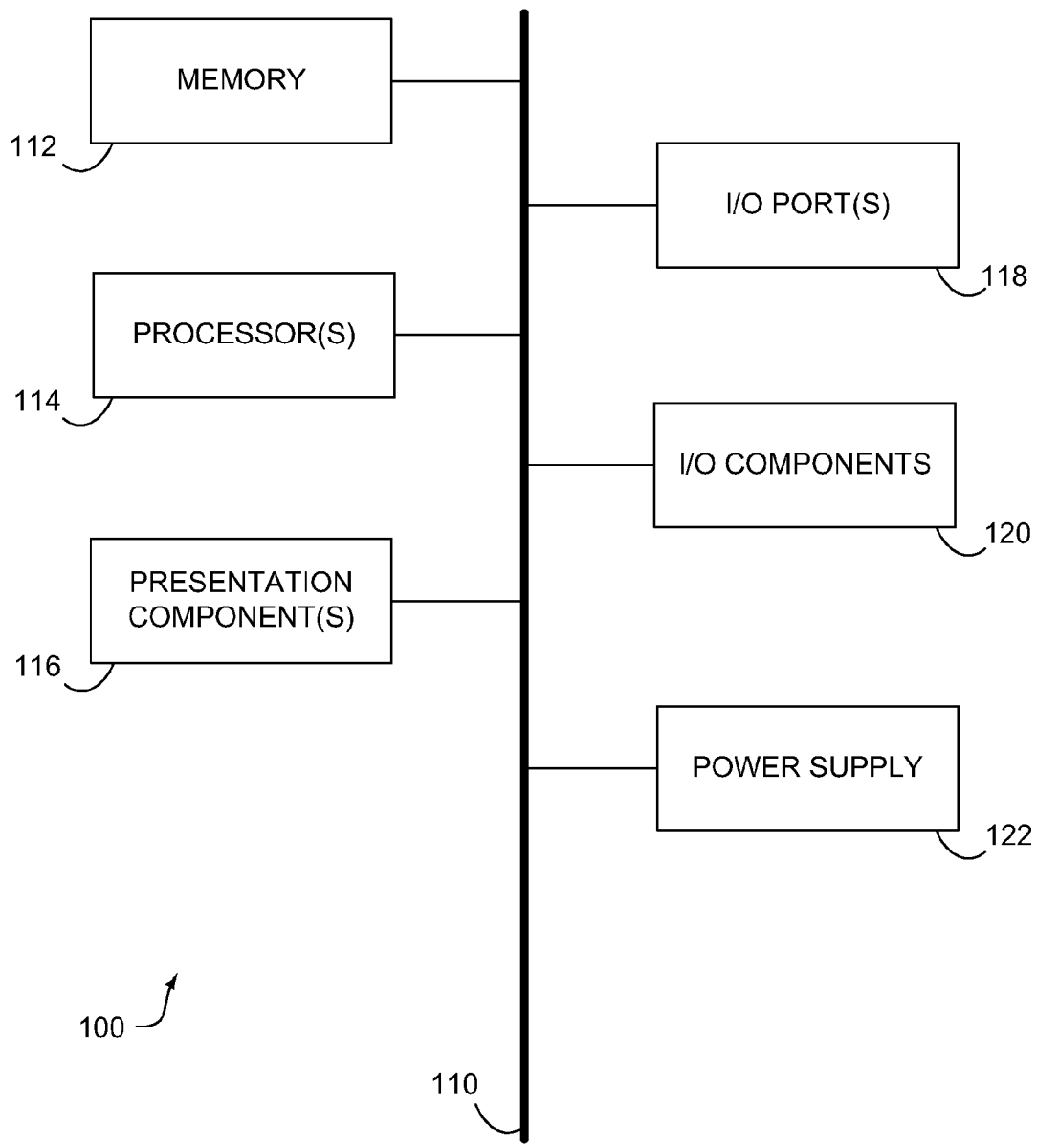
FIG. 3 is a diagram showing an exemplary operating environment suitable for implementing embodiments of the present invention.

Referring to FIG. 3, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 3, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 3 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventor recognizes that such is the nature of the art, and reiterate that the diagram of FIG. 3 is merely illustrative of an exemplary computing device that can be used in connection with one or more embodiments. Distinction is not made between such categories as "workstation," "server," "laptop," "hand-held device," etc., as all are contemplated within the scope of FIG. 3 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other tangible medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

I claim:

1. A method for managing business transaction documents, comprising:

authorizing, with a processor, a first monitoring administrator and a second monitoring administrator to access system usage data of a document or set of documents from a database stored on or otherwise accessible by the processor, wherein the first and second monitoring administrators are under a same system administrator of the database;

authorizing, with the processor, a plurality of users to access the document or set of documents from the database and generate system usage data corresponding to each of the users, wherein the first monitoring administrator commands the processor to authorize a first subset of the users and the second monitoring administrator commands the processor to authorize a second subset of the users, wherein the first monitoring administrator does not have the ability to deny access to the document or set of documents to the second subset of the users and the second monitoring administrator does not have the ability to deny access to the document or set of documents to the first subset of the users;

associating a first unique identifier with each of the users in the first subset of users and associating a second unique identifier with each of the users of the second subset of users, with the processor, wherein the first unique identifier is associated with the first monitoring administrator authorized to access the system usage data corresponding to each of the users in the first subset of the users, wherein the second unique identifier is associated with the second monitoring administrator authorized to access the system usage data corresponding to each of the users in the second subset of the users, storing the system usage data generated by each of the users;

providing the system usage data associated with any of the users associated with the first unique identifier to the first monitoring administrator;

providing the system usage data associated with any of the users associated with the second unique identifier to the second monitoring administrator; and deleting the system usage data of the document or set of documents for one or more of the users after a defined time period, upon completion of a transaction associated with the document or set of documents, or upon finalization of the document or set of documents.

2. The method of claim 1, wherein the system usage data comprises at least one of: times the database was accessed by the specific ones of the users; which documents were accessed by the specific ones of the users, and an amount of time spent with a document accessed by the specific ones of the users.

3. The method of claim 1, further comprising the step of authorizing users, with the processor, to post documents to the database.

* * * * *